Sept. 11, 1928.
N. H. DAVIS
CHILD'S VEHICLE
Filed April 30, 1925
1,683,872
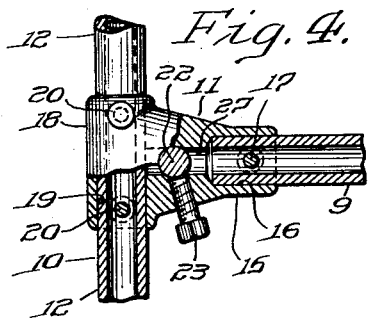
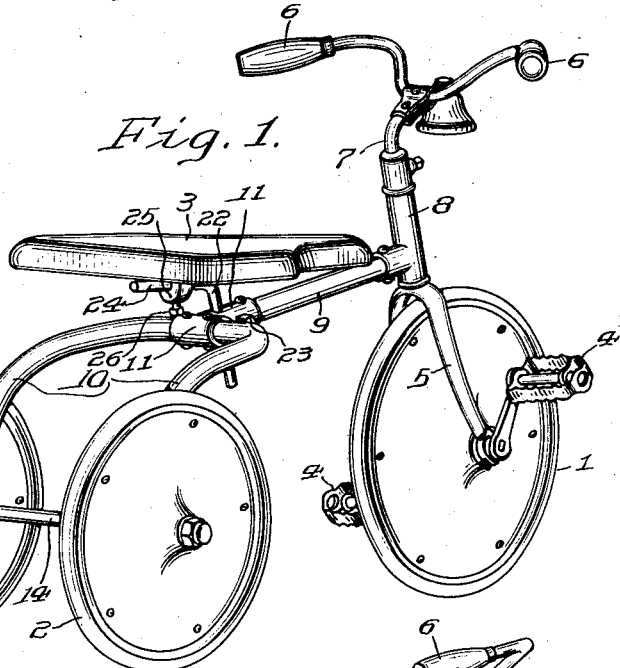
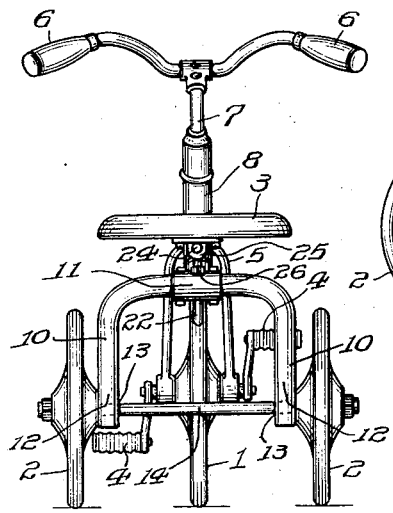
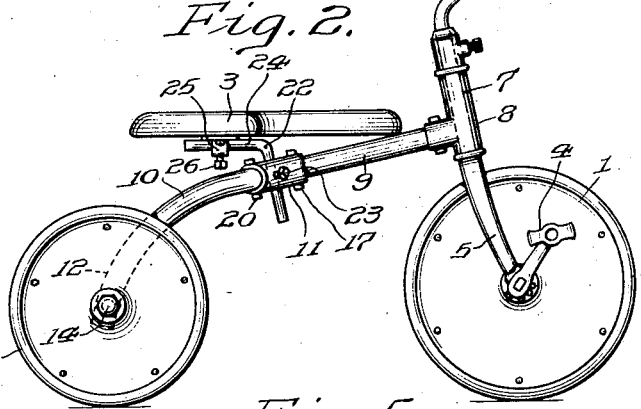
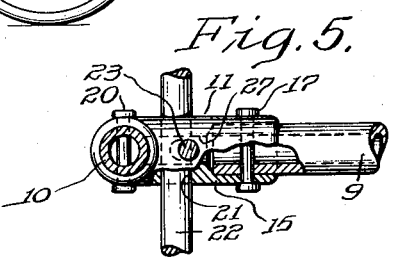
INVENTOR
Nathan H. Davis.
BY
John D. Myers
ATTORNEY
WITNESS
F. J. Hartman.

Patented Sept. 11, 1928.

1,683,872

UNITED STATES PATENT OFFICE.

NATHAN H. DAVIS, OF PHILADELPHIA, PENNSYLVANIA, ASSIGNOR TO KEYSTONE LANTERN COMPANY, A CORPORATION OF NEW JERSEY.

CHILD'S VEHICLE.

Application filed April 30, 1925. Serial No. 27,042.

My invention relates to children's vehicles, and particularly to that type which may be propelled either by means of pedals, in the manner of a velocipede, or by running the feet over the ground as in paddling, and the object of the invention is to provide a simple and efficient construction of vehicle, including an improved frame, which overcomes a certain weakness and danger of breakage inherent in the usual construction and is particularly adapted to withstand hard usage, thus being capable of being used with greater safety, as well as having a longer life.

In vehicles of this character having the usual frame of tubing, it has been found that the reach or, as it is sometimes called, the backbone of the frame has a tendency to fracture intermediate of its ends at the point where it is formed with an opening to receive the adjustable seat-post, and that the usual reenforcing sleeve, which is fitted around the reach at that point, does not altogether eliminate this difficulty, as the reaches frequently fracture within the sleeves when subjected to heavy strain.

According to the present invention, I provide a frame of tubing in which the reach and the fork at the rear end thereof (for supporting the rear axle and wheels), are brought together below and adjacent to the seat, and which includes a coupling of relatively heavier and stronger construction, that is located substantially midway between the front and rear wheels and that serves the dual function of uniting the reach and the fork and also of providing a strong support for the adjustable seat-post, whereby to obviate any weakening of the frame at the latter point.

Another object of the invention is to provide an improved vehicle of this type, in which the seat has both vertical and horizontal adjustment, the vertical adjustment enabling the child to be positioned on the seat so that its feet may be run over the ground as in paddling, and the horizontal adjustment enabling the child to operate properly the pedals without disturbing the paddling adjustment.

With these and other objects in view, the invention comprises all of the various novel features of construction and arrangement, hereinafter set forth and illustrated in the accompanying drawings, in which—

Figure 1 is a perspective view of my improved vehicle;

Fig. 2 is a side elevation thereof on a somewhat reduced scale;

Fig. 3 is a rear elevation, also on a somewhat reduced scale; and

Figs. 4 and 5 are enlarged fragmentary views showing the coupling in detail.

Referring to the drawing, my improved child's vehicle embodies a front or steering wheel 1, a pair of transversely spaced rear wheels 2 and a seat 3 arranged at a higher elevation than and substantially midway between the wheels. The front wheel is provided with pedals 4, by means of which the vehicle may be propelled in the usual manner of a velocipede, and this wheel is mounted in a steering fork 5 pivotally supported at the front end of the frame of the vehicle and adapted to be turned by handle bars 6. In the preferred embodiment of the invention, the fork has a stem or steering post 7 rotatably mounted within a tubular socket or steering head 8 provided at the front end of the frame, but it is to be understood that any suitable form of pivotal support may be provided between the fork and the front end of the frame so far as the present invention is concerned.

The frame of the vehicle is preferably formed of tubing and embodies a reach (or, as it is sometimes called, a backbone) 9, and a separate rear fork 10. The reach extends longitudinally from front to rear and is preferably inclined slightly downwardly and rearwardly, as shown. At its rear end, the reach is united to the fork 10 and the parts rigidly secured together by means of a coupling 11. The rear fork is preferably of substantially inverted U-shape, although not necessarily so, since it may be of inverted V-shape, and the sides or branches 12 of the rear fork project laterally on opposite sides of the coupling and are inclined rearwardly and downwardly in spaced relation and are provided at their rear extremities with transversely aligned bearings 13 in which the rear axle 14 is supported with its ends projecting laterally therefrom and carrying the rear wheels 2.

The coupling 11 is of relatively heavier and stronger construction than the tubing forming the reach and the rear fork, and may be, for instance, a casting of malleable iron. The coupling is preferably T-shaped and is formed in its longitudinal member 15 with a forwardly opening socket 16 into which the rear end of the reach is fitted and securely held by means of a pin 17. The transverse member 18 of the T-coupling is disposed horizontally and formed with a socket 19 extending therethrough and opening outwardly through the opposite ends thereof and adapted to receive the rear fork, which is securely held therein by means of pins 20. This is the preferred arrangement and permits the fork to be formed of a single piece of tubing which, in the construction of the frame, is forced through the transverse member 18 of the coupling and is then bent on opposite sides thereof to form the sides or branches 12.

It is to be noted that the coupling is located substantially midway between the front and rear wheels and that the reach and the rear fork are brought together below and adjacent to the seat 3, whereby to permit the coupling 11 to serve the dual function of rigidly uniting the parts, as above described, and of also providing a strong support for the seat. The reach and the rear fork are of a length to support the rear wheels in rearwardly spaced relation to the front wheel to provide an unobstructed leg space therebetween to permit the vehicle to be propelled either by the pedals or by running the feet over the ground as in paddling.

For supporting the seat, a socket 21 is formed in the coupling and opens outwardly through both the top and bottom thereof, and receives a seat-post 22 which passes downwardly entirely through the coupling and is adjustable therein to support the seat at the required elevation, a set screw 23 being threaded into the coupling and impinging against the seat-post to secure it in vertically adjusted position. The upper end of the seat-post is angularly disposed as at 24 and extends rearwardly and substantially horizontally and is engaged by a clamp 25 secured to the underside of the seat and by means of which the seat may be shifted longitudinally of the vehicle; that is, from front to rear. The clamp is fixed in position on the angularly disposed end 24 of the seat-post by a set screw 26. The vertical adjustment of the seat enables the child to be positioned thereon so that its feet may be run over the ground as in paddling, and the horizontal adjustment of the seat enables the child to operate properly the pedals without disturbing the paddling adjustment.

The socket 21 preferably extends through the coupling intermediate of the sockets 16 and 19, and in a direction substantially perpendicular to the plane of the axes thereof so that the seat-post clears the portions of the reach and rear fork secured therein respectively. The socket 21 is thus located at about the center of the coupling and in the longitudinal member 15 thereof adjacent its intersection with and mergence into the transverse member 18. This equalizes the strain and renders the construction particularly strong and durable. For this purpose the longitudinal member 15 is also gradually increased in width from front to rear, so as to reenforce the coupling and provide a greater amount of metal on opposite sides of the socket 21. To offset the additional weight due to this reenforcement, the coupling may be formed, if desired, with a counterbore 27 extending rearwardly from the socket 16 and opening into the socket 19.

From the foregoing description it will be seen that I have provided an improved construction of child's vehicle in which the seat-post is entirely supported by the coupling between the reach and rear fork, instead of passing through and weakening the reach in the usual manner and hence the latter defect is overcome and the necessity of providing a reenforcing sleeve on the reach is obviated. The coupling, being of stronger construction than the reach and rear fork, is adapted to withstand the additional strain imposed upon it and serves its dual function of rigidly uniting the reach and fork and of providing a strong support for the seat, without attendant weakening of the frame of the vehicle.

Furthermore, I have provided a child's vehicle adapted to be propelled either by paddling or by pedalling, in which the seat may be readily adjusted to permit children of different sizes to ride the vehicle conveniently and comfortably and when adjusted vertically to the proper height for paddling, may be further adjusted horizontally to the proper distance for pedalling without disturbing the paddling adjustment.

My improved construction is simple and efficient, effects substantial economies in manufacture, affords maximum strength and durability, may be used with safety, and will stand hard usage without breakage.

Having thus described my invention, I claim and desire to protect by Letters Patent of the United States:

1. A child's vehicle of the character described, comprising a front wheel mounted for steering and provided with pedals, a tubular reach, a separate, tubular rear fork, rear wheels carried by the rear fork, a coupling connecting the rear fork and the reach and located substantially midway between the front and rear wheels, and a seat adjustably mounted in said coupling and supported thereby between said front and rear wheels, the sides of the rear fork being inclined rearwardly and downwardly between the coupling and the axis of the rear wheels, and the reach and rear fork being of a length to support the rear wheels in rearwardly spaced relation to the front wheel to provide an unobstructed leg space therebetween to permit the vehicle to be propelled from the seat either by the pedals or by running the feet over the ground as in paddling.

2. A child's vehicle of the character described, comprising a reach, a fork at the rear end thereof, a T-coupling formed in its longitudinal and transverse members with sockets in which, respectively, said reach and fork are received and secured, said coupling being also formed in its longitudinal member with another socket extending entirely therethrough between said first-mentioned sockets and at an angle to the plane of axes of the same, and the longitudinal member of said coupling increasing in width toward said transverse member to reenforce said coupling on opposite sides of said last-mentioned socket, a seat-post mounted in said last-mentioned socket and slidable therein entirely through said coupling, and means for securing said seat-post in different adjusted positions in said coupling.

In testimony whereof, I have signed my name to this specification.

NATHAN H. DAVIS.